United States Patent
Crane

(10) Patent No.: US 8,706,404 B2
(45) Date of Patent: Apr. 22, 2014

(54) NAVIGATION FEATURES FOR OBTAINING FUEL BEFORE RETURNING A RENTAL VEHICLE

(75) Inventor: Aaron I. Crane, Palatine, IL (US)

(73) Assignee: Navteq B.V., Veldhoven (NL)

( * ) Notice: Subject to any disclaimer, the term of this patent is extended or adjusted under 35 U.S.C. 154(b) by 993 days.

(21) Appl. No.: 12/240,187

(22) Filed: Sep. 29, 2008

(65) Prior Publication Data
US 2010/0082246 A1    Apr. 1, 2010

(51) Int. Cl.
*G05D 1/00*    (2006.01)

(52) U.S. Cl.
USPC ........... 701/412; 701/400; 701/408; 701/409; 701/410; 701/411; 705/307; 705/338

(58) Field of Classification Search
None
See application file for complete search history.

(56) References Cited

U.S. PATENT DOCUMENTS

| | | | |
|---|---|---|---|
| 5,452,217 A * | 9/1995 | Kishi et al. | 701/207 |
| 6,202,026 B1 * | 3/2001 | Nimura et al. | 701/455 |
| 6,401,034 B1 | 6/2002 | Kaplan et al. | 701/209 |
| 6,434,482 B1 * | 8/2002 | Oshida et al. | 701/209 |
| 6,778,808 B1 * | 8/2004 | Shimazu | 455/3.03 |
| 7,177,738 B2 | 2/2007 | Diaz | 701/29 |
| 7,382,289 B2 | 6/2008 | McCarthy et al. | 340/995.1 |
| 7,412,313 B2 | 8/2008 | Isaac | 701/29 |
| 7,865,306 B2 * | 1/2011 | Mays | 701/211 |
| 2004/0199303 A1 * | 10/2004 | Ohmura et al. | 701/5 |
| 2005/0107035 A1 * | 5/2005 | Zoeckler | 455/12.1 |
| 2007/0010942 A1 | 1/2007 | Bill | 701/209 |
| 2007/0049192 A1 * | 3/2007 | Hoffmann et al. | 455/3.02 |
| 2007/0239494 A1 | 10/2007 | Stephens et al. | 705/5 |
| 2008/0036577 A1 * | 2/2008 | Natsume et al. | 340/425.5 |
| 2010/0106514 A1 * | 4/2010 | Cox | 705/1.1 |

* cited by examiner

*Primary Examiner* — Fateh Obaid

(74) *Attorney, Agent, or Firm* — Lempia Summerfield Katz LLC

(57) ABSTRACT

Systems, devices, features, and methods for routing to a fuel or gasoline station before returning a rental vehicle are disclosed. For example, one method comprises identifying a selected destination to be a rental service return location associated with a rental vehicle. An option to obtain gasoline before returning the rental vehicle to the rental service return location is offered. Upon selection of the option, a gasoline station along a route to the rental service return location is identified. Route guidance to the gasoline station is provided. Route guidance from the gasoline station to the rental service return location is also provided.

12 Claims, 9 Drawing Sheets

NAVIGATION FEATURES FOR OBTAINING FUEL BEFORE RETURNING A RENTAL VEHICLE

BACKGROUND OF THE INVENTION

The present invention relates to navigation and, more particularly, to obtaining fuel before returning a rental vehicle.

Transportation in today's society is a tool and/or luxury for several participants. For example, people use cars or other vehicles for daily activities, such as going to work and coming home, running errands, and visiting friends and family. Vehicles are also utilized for vacations and business trips.

Rental vehicle services provide vehicles to people for a number of situations. For example, if a person does not want to use his or her car for a trip, a rental vehicle may be acquired. Or, if a person takes a plane to a location, a rental vehicle may be obtained for driving around or reaching other destinations after arriving at the location.

When renting a rental vehicle, terms and conditions of use of the rental vehicle and return of the rental vehicle are agreed upon. For example, a rental vehicle service provider may require that the gasoline tank of the rental vehicle be full before returning the rental vehicle, and if the rental vehicle is returned without a full gasoline tank, an extra fee or charge may be applied.

However, sometimes a person renting a rental vehicle may forget to get gasoline before returning the rental vehicle, may not know how to get to a gasoline station, may not have enough time to look for a gasoline station, and/or may waste time and gasoline searching for a gasoline station. Also, the person renting the rental vehicle may be unaware of ideally or conveniently located gasoline stations and how to navigate to them before returning the rental vehicle to a rental service return location.

SUMMARY OF THE INVENTION

According to one aspect, a method of routing to a gasoline station before returning a rental vehicle using a navigation device is provided. For example, a selected destination is identified to be a rental service return location associated with a rental vehicle. An option to obtain gasoline before returning the rental vehicle to the rental service return location is offered. Upon selection of the option, a gasoline station along a route to the rental service return location is identified. Route guidance to the gasoline station is provided. Route guidance from the gasoline station to the rental service return location is also provided.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
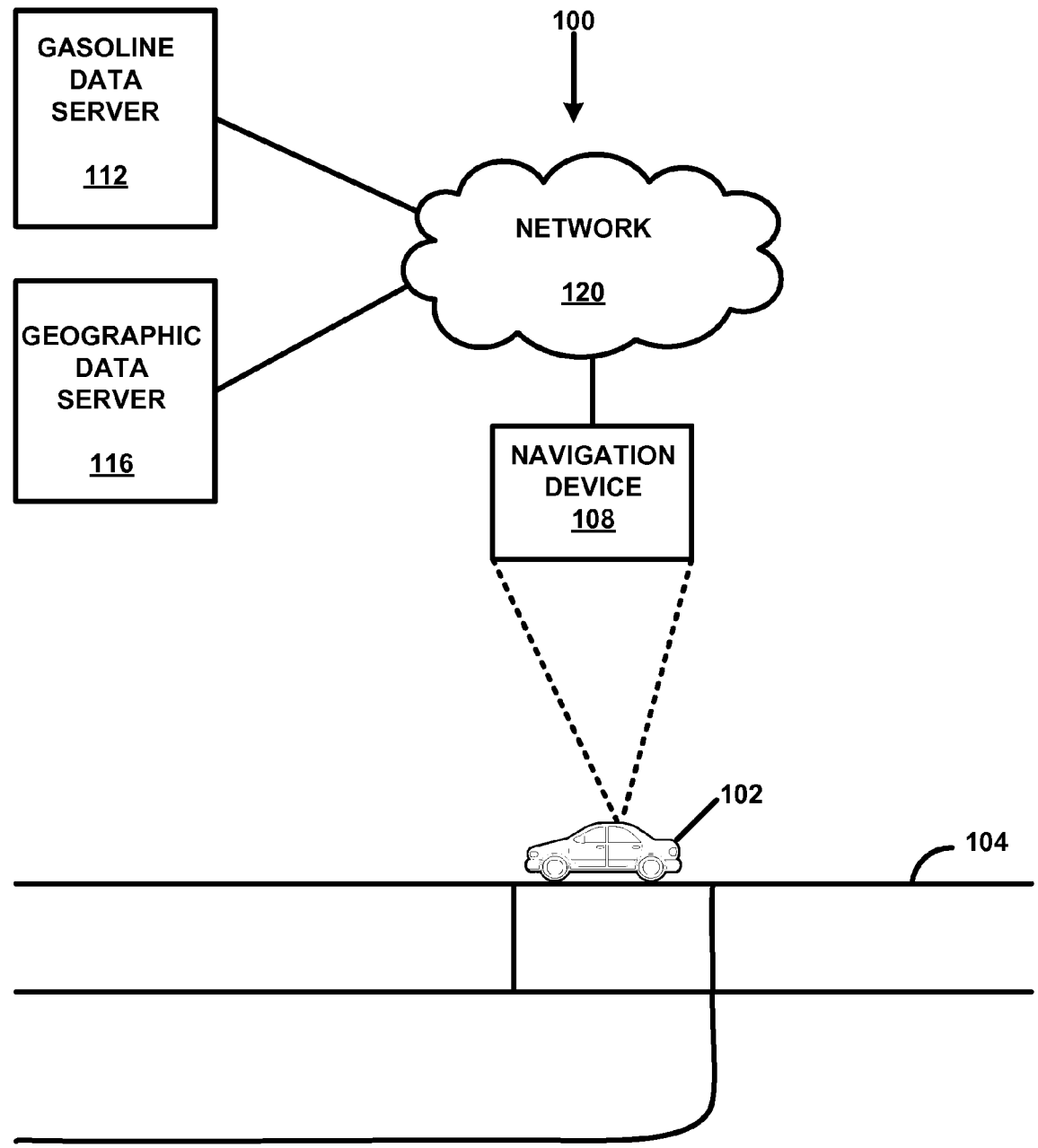
FIG. 1 is a diagram of a system for routing to a gasoline station before returning a rental vehicle.

FIG. 1 shows one embodiment of a system 100 for routing to a fuel or gasoline (hereinafter referred to as "gasoline") station before returning a rental vehicle. The system 100 includes, but is not limited to, a rental vehicle 102, a road network 104, a navigation device or system 108, a gasoline data server 112, a geographic data server 116, and a network 120. Additional, fewer, or different components may be provided. For example, a proxy server, a rental service server, a traffic server, a cache server or cache network, a base station, transceiver and/or broadcasting components, a router, a switch or intelligent switch, computers or workstations, administrative components, a gateway device, a backbone, ports, network connections, and network interfaces may be provided. While the components in FIG. 1 are shown as separate from one another, one or more of these components may be combined.

The rental vehicle 102 is a car, truck, bus, motorcycle, or any other vehicle that can be rented or leased for driving on roads, such as the road network 104. The road network 104 includes one or more roads in a geographic area. The geographic area may be a subdivision, a town or suburb, a city, a state or province, a country, or any other geographic region.

The rental vehicle 102 is rented from a rental service provider that offers vehicles to customers. Rental service providers include, but are not limited to, Hertz, Avis, Budget, Enterprise, or other providers. For example, a potential renter or customer agrees to terms and conditions, such as via a contract, with a rental service provider for renting a vehicle for a number of days or a specified time period. The terms and conditions may also include gasoline policies when returning the rental vehicle 102 to a rental service return location of the rental service provider. For example, the rental service provider may offer the customer the option of returning the rental vehicle 102 without refueling in which the rental service provider will refuel the rental vehicle 102. However, such an option usually involves an additional fee when renting the rental vehicle 102. Alternatively, the rental service provider may require the customer or renter to refuel the rental vehicle 102 before returning the rental vehicle, and if the renter does not refuel the rental vehicle 102, a penalty fee is charged to the renter or a surcharge is attributed to the amount or price of gasoline.

The navigation device 108 is an in-vehicle navigation system, a personal navigation device ("PND"), a portable navigation device, a cellular telephone, a mobile phone, a personal digital assistant ("PDA"), a watch, a computer, and/or other device that can perform navigation-related functions, such as digital routing and digital route guidance. In one embodiment, the navigation device 108 is a cellular telephone, such as a cellular telephone provided by Nokia Corporation location in Espoo, Finland. The driver or passenger of the rental vehicle 102 uses the cellular telephone to navigate about the road network 104. For example, the cellular telephone runs navigation software that performs functions such as route calculation, route guidance, map display, time of arrival estimations, speed estimations, and other navigation-related functions. Alternatively, route calculations and other navigation software processes may occur at a base station, server, or other remote location, and the cellular telephone downloads or receives map displays, route guidance, and other navigation features for guiding and routing the user of the cellular telephone. In an alternate embodiment, the navigation device 108 is an in-vehicle navigation system inside of the rental vehicle 102. A driver or passenger of the rental vehicle 102 may use the in-vehicle navigation system to route to desired destinations.

The navigation device 108 and/or software thereof may provide a user an option to obtain gasoline before returning the rental vehicle 102 to a rental service return location or office, as described in more detail below. For example, the navigation device 108 provides an option to locate and route to a gasoline station around a rental service return location before returning the rental vehicle 102 to the rental service return location. Such an option or feature may advantageously and conveniently assist a renter or customer in meeting his or her agreement of refueling the rental vehicle 102 before it is returned.

The navigation device 108 may be in communication with the gasoline data server 112 and/or the geographic data server 116 via the network 120. The network 120 is the Internet, an intranet, a local area network ("LAN"), a wide area network ("WAN"), a virtual private network ("VPN"), a cellular network, a satellite network, a broadcasting network, a wireless or wired connection, and/or any known or future network or connection.

The gasoline data server 112 is a provider server, application server, communications server, database server, proxy server, file server, web server, client server, peer-to-peer server, and/or any known or future server or data collection device. The gasoline data server 112 is a software and/or hardware implementation. For example, the gasoline data server 112 is an application program. Alternatively, the gasoline data server 112 is a server computer or any other hardware that executes and runs server applications.

The gasoline data server 112 is operable to receive content requests and provide gasoline and/or gasoline station information. For example, the gasoline data server 112 provides gasoline price data or information, such as dynamic gasoline price data, to the navigation device 108. In one embodiment, the gasoline data server 112 receives, periodically or continuously, gasoline price data from respective gasoline stations or intermediate devices, and the gasoline data server 112 provides the gasoline price data to the navigation device 108 via the network 120. The gasoline price data is transmitted to the navigation device 108 with gasoline station identifier data or codes so that the appropriate gasoline prices correspond to data entities representing the respective gasoline stations in a geographic database of the navigation device 108. Alternatively, locations codes or data are transmitted with the gasoline price data. For example, respective gasoline stations may correspond to location references, such as location reference objects ("LROs") in the geographic database of the navigation device 108. Accordingly, location identifiers or codes are transmitted with the gasoline price data to correspond to the respective location references in the geographic database. By receiving gasoline price data, a user of the navigation device 108 may view current or past gasoline prices of gasoline stations.

The gasoline data server 112 may also provide other information. For example, type or name brands of gasoline stations, amount of fuel at gasoline stations, whether a gasoline station has a car wash or convenient store, hours of operation, or other information related to gasoline stations or gasoline may be provided. However, some data, such as type or name brands of gasoline stations or other information, may be provided in a database of the navigation device 108, and communication with the gasoline data server 112 for this information may be unnecessary.

The geographic data server 116 is a provider server, application server, map server, communications server, database server, proxy server, file server, web server, client server, peer-to-peer server, and/or any known or future server or data collection device. The geographic data server 116 is a software and/or hardware implementation. For example, the geographic data server 116 is an application program. Alternatively, the geographic data server 116 is a server computer or any other hardware that executes and runs server applications.

The geographic data server 116 is operable to receive content requests and provide geographic data or content to the navigation device 108. For example, the geographic data server 116 provides geographic data to update a geographic database in the navigation device 108. Alternatively, the navigation device 108 may not include a geographic database, and the geographic data server 116 provides data from a geographic database to the navigation device 108 to perform navigation-related functions. In another embodiment, the geographic data server 116 performs navigated related functions and provides routing data and routing guidance to the navigation device 108.

The geographic data server 116 may also communicate with the gasoline data server 112. For example, gasoline price data may be associated with geographic data or features in the geographic data server 116, and, therefore, gasoline pricing data along with identification codes and/or geographic data may be provided to the navigation device 108 via the geographic data server 116.

The navigation device 108 may communicate with other devices, systems, and/or applications via the network 120 or other network. For example, the navigation device 108 may communicate with a rental service provider server in which information on the rental car, the rental agreement, and/or rental service return locations may be received or exchanged. Also, the navigation device 108 may download programs or files from the Internet or other sources that may or may not relate to navigation or geographic features. Alternatively, the navigation device 108 may not communicate with servers, devices, or applications via the network 120 or other network and may solely rely on included data and software to perform the functions of offering an option to obtain gasoline before returning the rental vehicle 102 and routing to a gasoline station before returning the rental vehicle 102.

Figure 2:
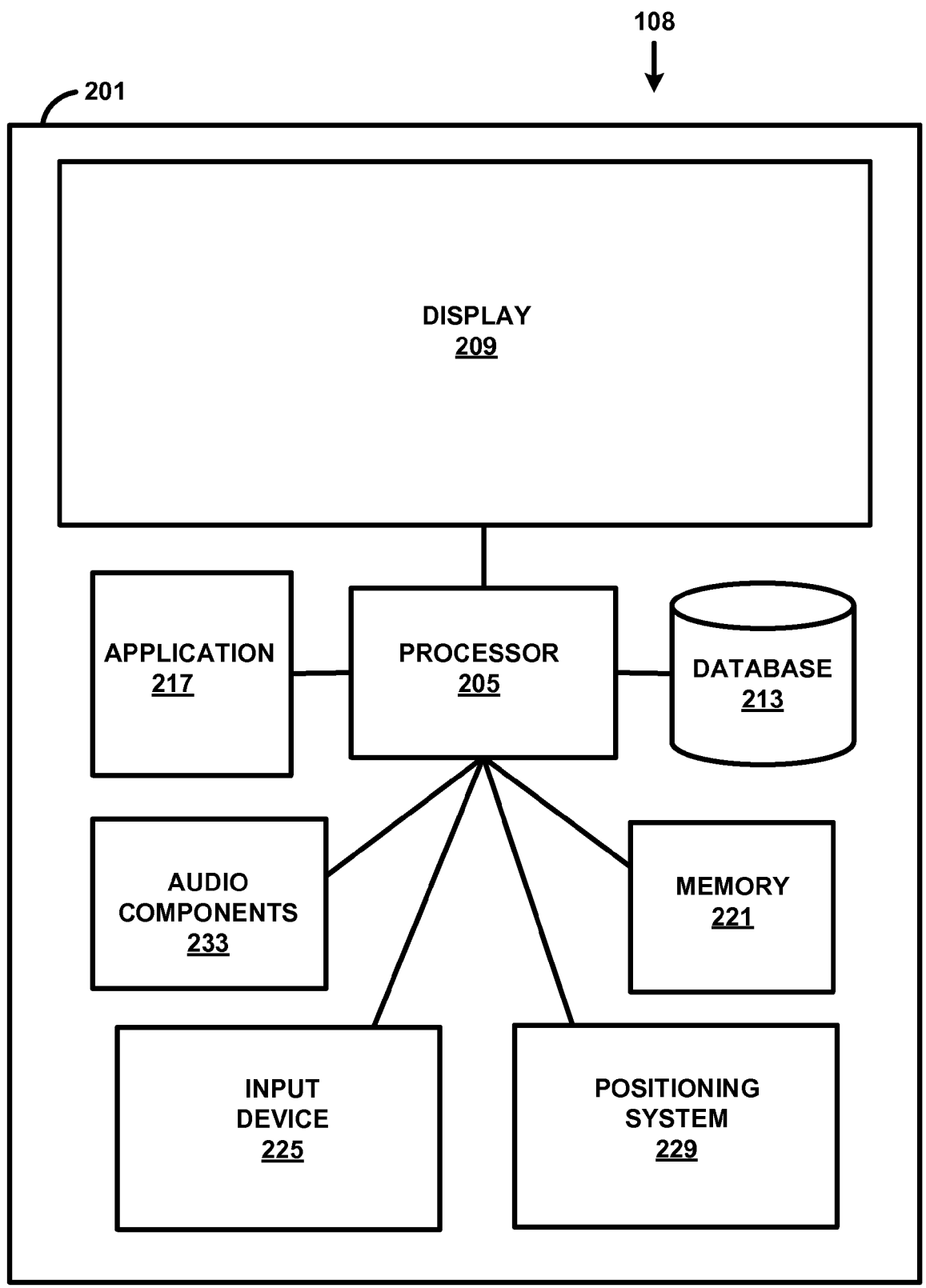
FIG. 2 illustrates components of a navigation device of the system of FIG. 1.

FIG. 2 illustrates components of the navigation device 108. The navigation device includes, but is not limited to, a housing 201, a processor 205, a display 209, a geographic database 213, an application program 217, a memory 221, an input device 225, a positioning system or device 229, and audio components 233. Additional, fewer, or different components may be provided. For example, wireless transmitter and receiver components (such as an antenna) may be provided, and wired connections and ports may also be provided. While the components in FIG. 2 are shown as separate from one another, one or more of these components may be combined. Alternatively, the database 213, the application 217, and/or software for performing navigation-related functions, such as executed by the processor 205, may be stored in a device or system remote from the navigation device 108, such as in the geographic data server 116 or other server or device.

The housing 201 includes metal, plastic, and/or other materials. The housing 201 may have a shape corresponding to a cellular telephone, PDA, or other geometric shape. The housing 201 may house or support the processor 205, the display 209, the geographic database 213, the application program 217, the memory 221, the input device 225, the positioning system or device 229, and the audio components 233. The display 209 is any mechanical and/or electronic display positioned for accessible viewing in, on, or in communication with the navigation device 108. For example, the display 209 is a touch screen, liquid crystal display ("LCD"), cathode ray tube ("CRT") display, or a plasma display. The display 209 is operable to display images, such navigation related images and geographical representations or icons thereof. The input device 225 is one or more buttons, keypad, keyboard, mouse, trackball, rocker switch, touch pad, voice recognition circuit, or other device or component for controlling or inputting data in the navigation device 108. The audio components 233 may include a speaker, microphone, audio jacks or connections (e.g., for a headset or headphones), and/or other audio circuitry. The positioning system or device 229 is a global positioning satellite ("GPS") system, one or more mechanical and/or electrical sensors, one or more gyroscopes, a local positioning system, or other system or device for providing location data (such as longitude, latitude, and/or altitude) of the navigation device 108.

The display 209, the input device 225, the positioning system 229, and the audio components 233 are in communication with the processor 205. The processor 205 is a general processor, application-specific integrated circuit ("ASIC"), digital signal processor, field programmable gate array ("FPGA"), digital circuit, analog circuit, or combinations thereof. The processor 205 is one or more processors operable to control and/or communicate with the various electronics and logic of the navigation device 108. The processor 205 is configured to perform navigation-related functions, such as route calculation, route guidance, estimations of arrival times, geographic searches, and/or estimations of speed or velocity. For example, the processor 205 uses geographic data from the geographic database 213 and position data from the positioning system 229 to perform the navigation-related functions. The processor 205 is further configured to execute or run the application program 217.

The application program 217 is software and/or code for offering an option to obtain gasoline before returning a rental vehicle, such as the rental vehicle 102, and for routing to a gasoline station before returning the rental vehicle. The application program 217 may be stored in the memory 221 or other device or component of the navigation device 108. The application program 217 may be separate from or a part of a navigation-related function program.

The memory 221 is in communication with the processor 205. The memory 221 is any known or future storage device. The memory 221 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 221 may be part of the processor 205. The memory 221 is operable or configured to store geographic data, gasoline station data, gasoline price data, or other data associated with the navigation device 108.

The processor 205 is also in communication with the geographic database 213. The geographic database 213 may or may not be part of the memory 221. The geographic database 213 contains data (also referred to as "geographic data" or "spatial data") that represent geographic features in a coverage area. The coverage area may correspond to an entire country, such as the United States. Alternatively, the coverage area may correspond to several countries, such as the United States, Canada, and Mexico, or France, Germany, and Italy, and so on. According to another alternative, the coverage area of the geographic database 213 may represent only a single region within a country, such as the West Coast or the Midwest of the U.S. or a city, town, or portions thereof. Although the geographic database 213 includes data that represent geographic features in the entire coverage area, there may be parts of the coverage area that contain geographic features that are not represented by data in the geographic database 213, or for which the representation of geographic features is sparse.

In one embodiment, the geographic database 213 includes data or attributes about the road network 104 located in the coverage area. The data about the road network 104 include various kinds of information, such as the geographic coordinates of positions of the roads, street names of the roads, address ranges along the roads, turn restrictions at intersections of roads, speed limits of roads, and other vehicle navigation attributes. The geographic database 213 also includes data about points of interest in the covered area. Points of interest may include gasoline stations, hotels, restaurants, museums, stadiums, offices, automobile dealerships, auto repair shops, etc. The geographic database 213 may include data about the locations of these points of interests. The geographic database 213 may also include data about places, such as cities, towns, or other communities, and other geographic features, such as bodies of water, mountain ranges, etc. The geographic database 213 may include other kinds of information.

In one embodiment, the geographic database 213 contains at least one road segment data record (also referred to as "entity" or "entry") for each road segment. A road segment represents a part of a road, such as a portion of a road between two intersections. The geographic database 213 also includes a node data record (or "entity" or "entry") for each node. A node represents an end point of a road segment. Accordingly, the road network 104 may be represented by a plurality of road segments and nodes. The road segments and nodes may be associated with attributes, such as geographic coordinates, street names, address ranges, turn restrictions at intersections, and other vehicle navigation attributes, as well as points of interests. The terms "nodes" and "segments" represent only one terminology for describing these physical geographic features, and other terminology for describing these features is intended to be encompassed within the scope of these concepts.

There are different ways to collect data used for developing the geographic database 213, such as by a map developer or geographic database developer. These ways include obtaining data from other sources, such as municipalities. In addition, the geographic database developer may employ field personnel to travel by vehicle along roads throughout the geographic region to observe features and record information about them (e.g., using GPS tracking or geo-coding to model road patterns). The data collected by the geographic database developer are stored in a master geographic database. The master geographic database is stored in a format that facilitates updating, maintenance, and development. For example, the master geographic database or data in the master geographic database is in an Oracle spatial format, such as for development or production purposes. The master geographic database may be produced and/or maintained by a map developer, such as NAVTEQ North America, LLC located in Chicago, Ill. The Oracle spatial format or development/production database may be compiled into a delivery format, such as a GDF format. The data in the production and/or delivery formats may be compiled or further compiled to form the geographic database 213. For example, geographic data is compiled (such as into a PSF format) to organize and/or configure the data for performing navigation-related functions, such as route calculation, route guidance, map display, speed calculation, distance and travel time functions, and other functions, by a navigation device (e.g., the navigation device 108). The navigation-related functions may correspond to vehicle navigation.

Figure 3:
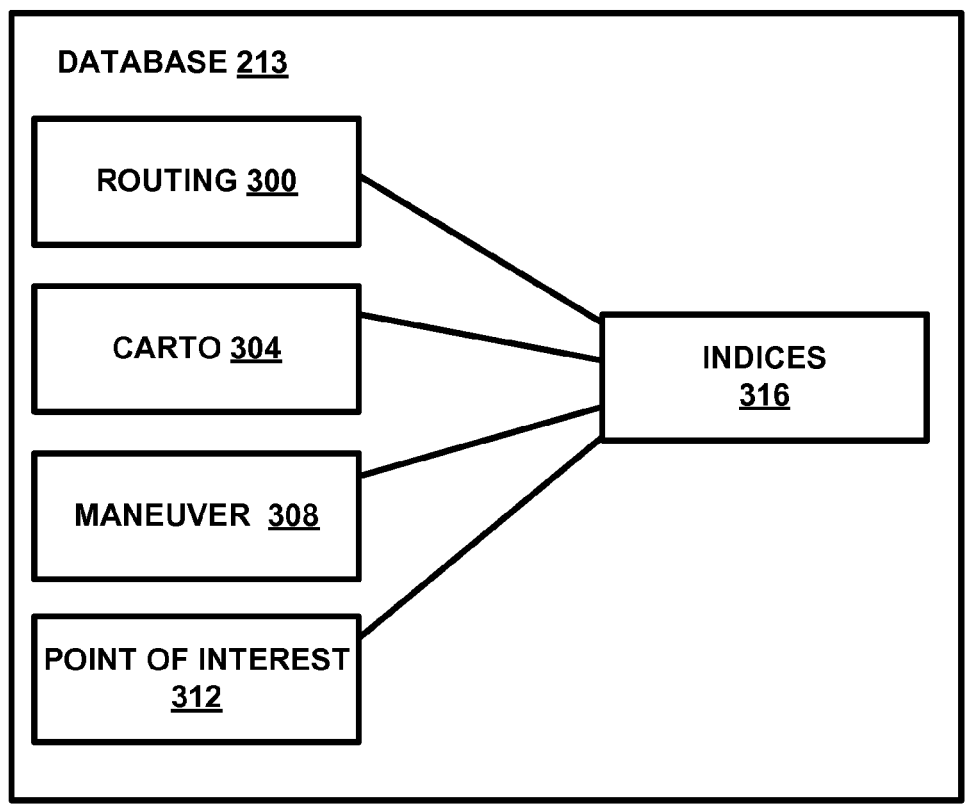
FIG. 3 is a diagram of one embodiment of a database of the navigation device of FIG. 2.

FIG. 3 is a diagram of one embodiment of the database 213. In order to provide the information in the geographic database 213 in a format more efficient for use by each of the navigation functions, separate subsets of the entire geographic database 213 for a given geographic region are provided for each of the different types of navigation functions to be provided in a navigation application program. The geographic database 213 includes separate routing data 300, cartographic data 304 (for map display), maneuver data 308 (for route guidance), and point-of-interest data 312. The geographic database 213 may be defined with fewer or more subsets than these, and other types of data may be defined and included. To permit these data subsets to work together, index files 316 may be included that provide cross references, search trees, or other data finding techniques.

Each subset of data may include only the data required to be used by a particular navigation function. There is some overlap of data between each of these subsets, with the result that some parts of the information may be included in more than one subset. For example, both the road segment data entity in the routing data subset 300 as well as the road segment data entity in the cartographic data subset 304 may include attributes identifying the nodes located at the ends of the segments. Although this duplication may result in a larger overall data storage requirement, each of the navigation functions benefits from the resultant efficiency of handling smaller amounts of data.

The geographic data in the geographic database 213 may also be organized in data layers (such as by creating a hierarchy of road segments by assigning classifications to different types of roads). Also, the geographic data may be organized into parcels or groups for spatial organization. When geographic data are organized spatially, features that are close together physically in the geographic region are represented by data records that are physically (or logically) close together in the database. For some of the navigation application functions, spatial parcelization of their respective data provides for reading closely related geographic data from the medium more quickly and loading related geographic data into memory where they can be used. Alternatively, the geographic data in the geographic database 213 may be organized in any manner different or similar to the methods discussed above for use in navigation-related functions.

Figure 4:
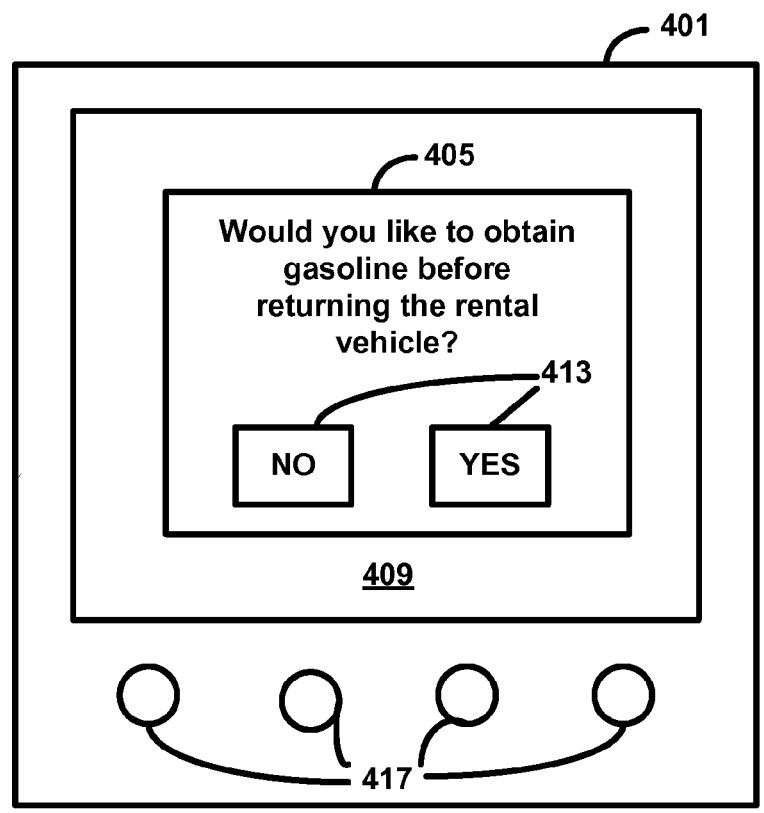
FIG. 4 illustrates an embodiment of offering an option to obtain gasoline before returning a rental vehicle via a navigation device.

FIG. 4 represents an embodiment of offering an option to obtain gasoline before returning a rental vehicle via a navigation device 401. The navigation device 401 may be similar to or different than the navigation device 108. In one embodiment, a user enters, inputs, or selects a destination using the navigation device 401. The destination is identified to be a rental service return location or office. For example, an inputted address corresponds to a rental service return location. Or, the user chooses from a selection of rental service return locations provided by the navigation device 401. Also, the navigation device 401 may be an in-vehicle navigation system that may have a hardware or software button or selection for routing back to a rental service return location associated with the rental vehicle, such as the rental vehicle 102.

Once the desired destination point is identified as a rental service return location or office, the application program 217 offers an option 405 via a display 409, such as the display 209. The option 405 is a graphical representation or icon that prompts or asks a user to decide if he or she would like to obtain gasoline before returning the rental vehicle. For example, the option 405 may include a phrase reciting "Would you like to obtain gasoline before returning the rental vehicle?" Other phrases or words may be used to convey an option or a query to obtain gasoline before returning a rental vehicle. The option 405 may also include software selection buttons or icons 413 for selecting or not selection the option 405. For example, a "Yes" icon 413 and "No" icon 413 may be provided for selection by the user. Alternatively, hardware buttons 417 may be used instead of or in addition to the software buttons or icons 413 for selection of the option 405.

If the option 405 to obtain gasoline is not taken (e.g., the user selects the "No" icon 413), then the navigation device 401 calculates a route from a current position of the navigation device 401 directly to the rental service return location. However, if the option 405 to obtain gasoline is selected (e.g., the user selects the "Yes" icon 413), the navigation device 401 identifies or determines a gasoline station (such as to be an intermediate destination point) along a route to the rental service return location.

In an alternative embodiment, instead of or in addition to offering the option 405 as a graphical representation, the option to obtain gasoline before returning the rental vehicle is offered via an audio or audible signal to the user. For example, a voice asking "Would you like to obtain gasoline before returning the rental vehicle?" is projected from the navigation device 401 or related speakers. The option may be selected or denied via one or more software buttons, hardware buttons, audio input (such as the user responding with his or her voice), and/or other input means.

Figure 5:
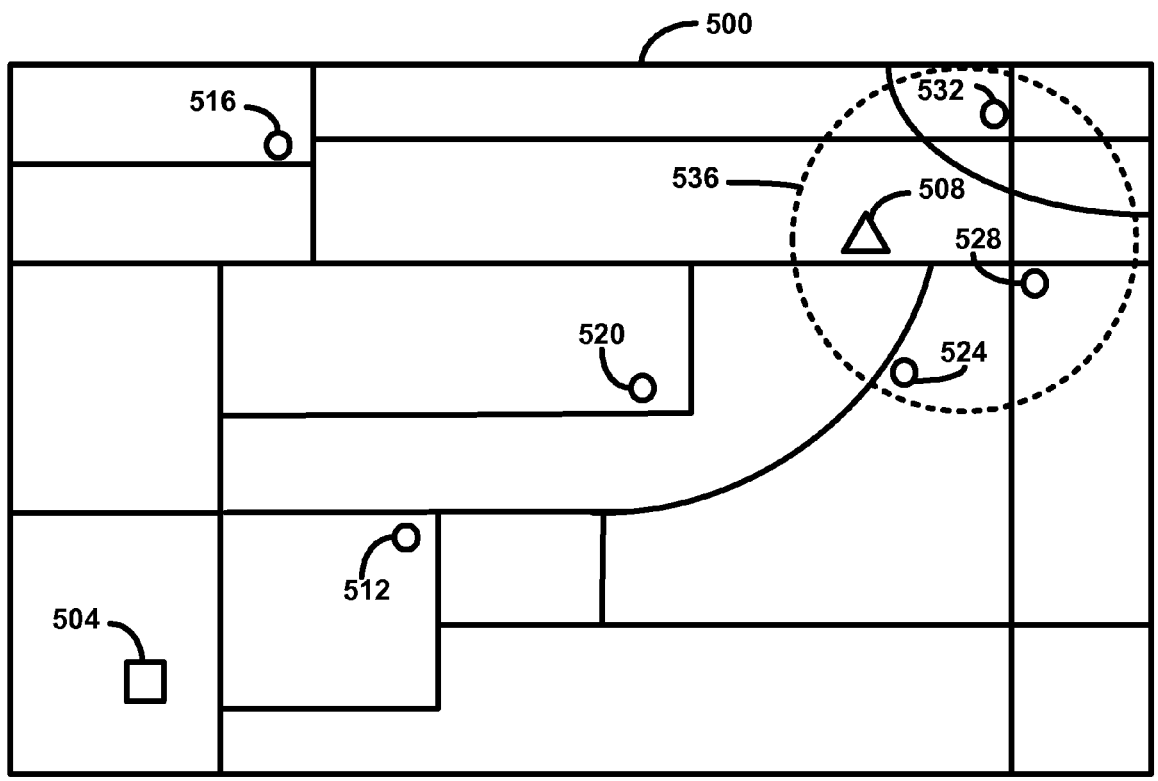
FIG. 5 shows representations of data entities corresponding to features for obtaining gasoline before returning a rental vehicle.

FIG. 5 shows representations of data entities corresponding to features for obtaining gasoline before returning a rental vehicle, such as the rental vehicle 102. For example, a geographic database, such as the geographic database 213, may include data entities representing roads or road segments 500, a data entity 504 that represents an origin point or a position of a navigation device (such as the navigation device 108 or 401) and/or a rental vehicle (such as the rental vehicle 102), and data entities representing points-of-interest 508, 512, 516, 520, 524, 528, and 532. Fewer, more, or different data entities may be provided. In one embodiment, the data entity 508 represents a rental service return location or office. The data entities 512, 516, 520, 524, 528, and 532 represent gasoline stations. Alternatively, the data entities 508, 512, 516, 520, 524, 528, and 532 may represent location references, such as LROs, which correspond to the respective points-of-interest.

Once an option to obtain gasoline before returning a rental vehicle is taken or selected, a data entity representing a gasoline station along a route to the data entity representing the rental service return location 508 is identified. For example, one or more data entities representing gasoline stations within a specified area 536, such as the data entities 524, 528, and 532, are identified, highlighted, or focused upon. The specified area 536 corresponds to an area that allows for relatively little or a minimum use of gasoline to provide or ensure a substantially full gasoline tank when the rental vehicle 102 is returned to the rental service return location. For example, dimensions of the specified area 536 may be determined based on distances to be traveled on roads from a boundary point to the rental service return location 508. In one embodiment, a radius or average boundary distance may be about at most 10 or 15 miles in which the rental service return location is a center point. Alternatively, the dimensions or radii associated with the specified area 536 may be any other distance. The specified area 536 is illustrated as a circle, but the specified area 536 may have any other geometric shape.

The dimensions or distances of the specified area may correspond to a particular rental vehicle. For example, one rental vehicle may have a miles-per-gallon rating different than another rental vehicle. Accordingly, the size of the specified area 536 may be larger or smaller based on the rental vehicle. Such miles-per-gallon information may be input into a navigation device, such as the navigation device 108 or 401, by a rental service provider or a renter or user of the rental vehicle.

The specified area 536 may be adjustable or modified by a user or renter. For example, one may want to locate or identify a gasoline station within a smaller area around a rental service return location. Or, a user may want to expand the dimensions of the specified area 536 at his or her own risk. A selection or input menu or window or graphics user interface may be used to adjust or modify the specified area 536.

When data entities representing gasoline stations within the specified area 536 are located or identified, the data entity representing a gasoline station along a route, such as an intermediate destination, to the data entity representing the rental service return location 508 is determined, such as via the application program 217. For example, the selection of the gasoline station may be based on one or more factors. The gasoline station to be identified or determined may be the gasoline station that is nearest or closest to the rental service return location 508 (such as the gasoline station 528), the gasoline station that has the cheapest or lowest gasoline price, the gasoline station of a preferred name brand or type (e.g., a user may want to use a discount or preferred card at a specific type of gasoline station or a user may prefer one type of gasoline over another type), and/or the gasoline station that is located conveniently or relatively the most conveniently with respect to driving to the rental return service return location. More, fewer, or different factors may be considered.

In one embodiment, the nearest gasoline station may be determined by calculating or determining a minimum distance to be traveled on roads from a gasoline station to the rental service return location 508. A gasoline station with the cheapest or lowest gasoline price may be determined by receiving gasoline pricing data or information, such as from the gasoline data server 112. A preferred type or name brand gasoline station may be determined based on data or information in the geographic database, such as the geographic database 213, or data received from an outside source, such as the server 112 or 116. The gasoline station that is located conveniently or more conveniently than other gasoline stations may be based on location and/or route calculations. For example, an initial direct route from the origin point to the rental service return location 508 may be calculated, and then a gasoline station or data entity thereof that may be on or besides a path of the calculated route (such as a gasoline station that will be on or next to a road that is used to get to the rental service return location 508—for example, the gasoline station 524) is identified or chosen. Accordingly, the driver does not have to substantially leave or divert from the original calculated route. Also, other factors may be considered when determining if a gasoline station is conveniently located, such as whether the gasoline station is on the right side of the road, whether the gasoline station is on a major or minor road, whether the gasoline station is at an intersection, and/or turn restrictions related to entering and leaving the gasoline stations. Any of the factors may be mixed and matched to determined or identify a gasoline station to be used as an intermediate destination.

The gasoline station may identified or chosen automatically. For example, preferences, such as in regards to gasoline price, type or name of gasoline station, location or proximity of the gasoline station, and/or convenience factors, may be entered or inputted by the developer of the application program, the rental service provider, or the renter of the rental vehicle 102 or the user of the navigation device 108 or 401. Based on these pre-entered inputs, the navigation device may automatically identify the gasoline station that will be part of a route to the rental service return location 508 when the option to obtain gasoline before returning the rental vehicle 102 is taken or selected. Alternatively, a user of the navigation device and/or renter of the rental vehicle may select the gasoline station from a plurality of gasoline stations.

Figure 6:
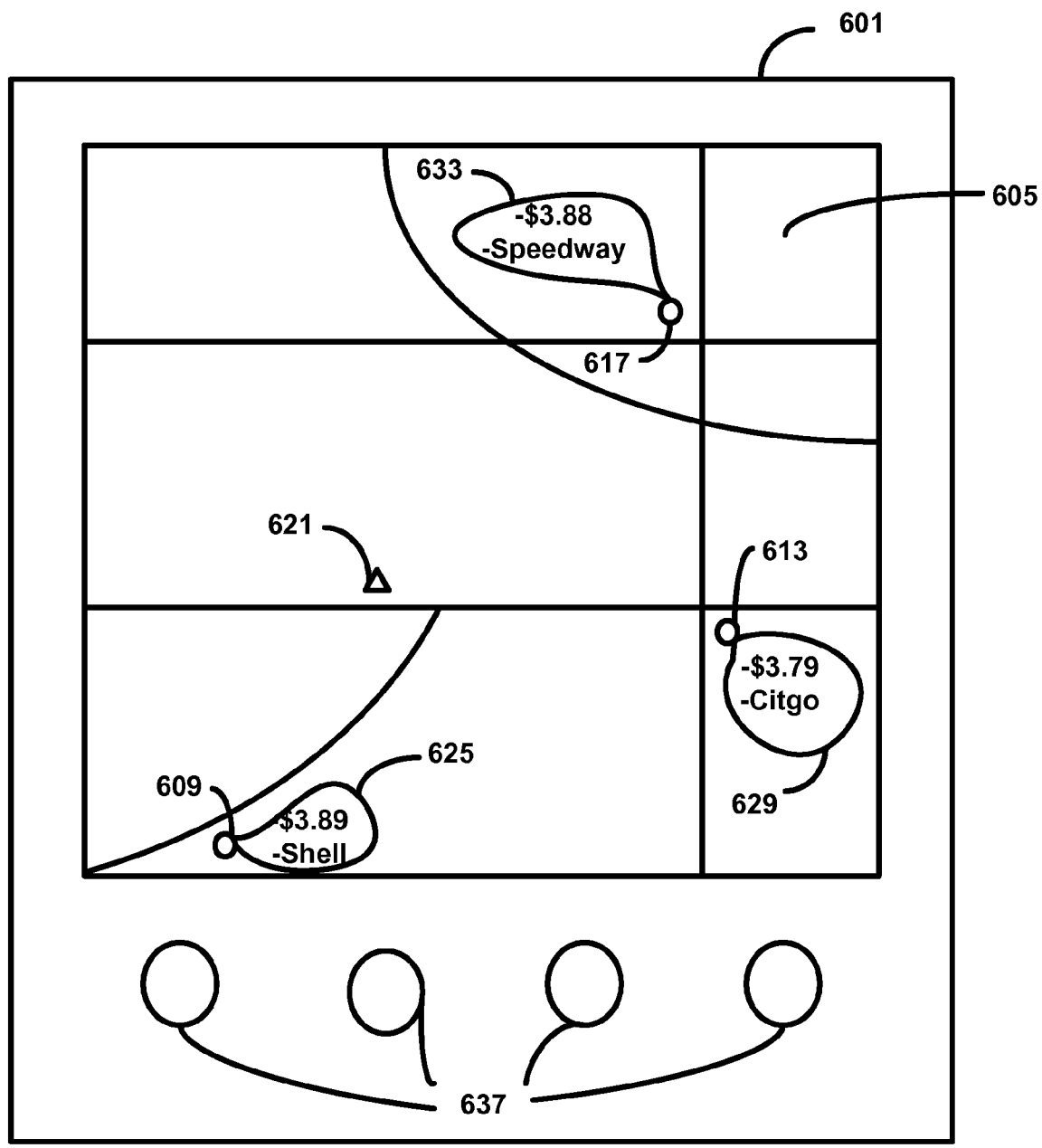
FIG. 6 illustrates a selection screen of a navigation device.

FIG. 6 illustrates a selection screen, display, and/or graphics user interface 605 of a navigation device 601, such as the navigation device 108 or 401. In one embodiment, graphical representations or icons 609, 613, and 617 of the gasoline stations within a specified area, such as the area 536, are displayed. Other features, such as roads or a road network or an icon 621 representing a rental service return location, may be displayed as well. Graphical representations 625, 629, and 633 of gasoline pricing data or costs and/or gasoline station names (such as Shell, CITGO, and Speedway) may be displayed or associated with the respective graphical representations 609, 613, and 633 of the gasoline stations. A user may view the locations of the gasoline stations as well as the information associated with them and then select one of the gasoline stations to be part of a route to the rental service return location or office. For example, a user may touch or point to a desired gasoline station on the screen 605. Or, the user may use one or more hardware buttons 637 to select the gasoline station. In an alternate embodiment, instead of or in addition to displaying graphical representations of the gasoline stations, data representing the gasoline stations and information or data associated with the gasoline stations, such as price, name, distance, or location data, may be in a list format or other format for selection with or without a map display.

Figure 7:
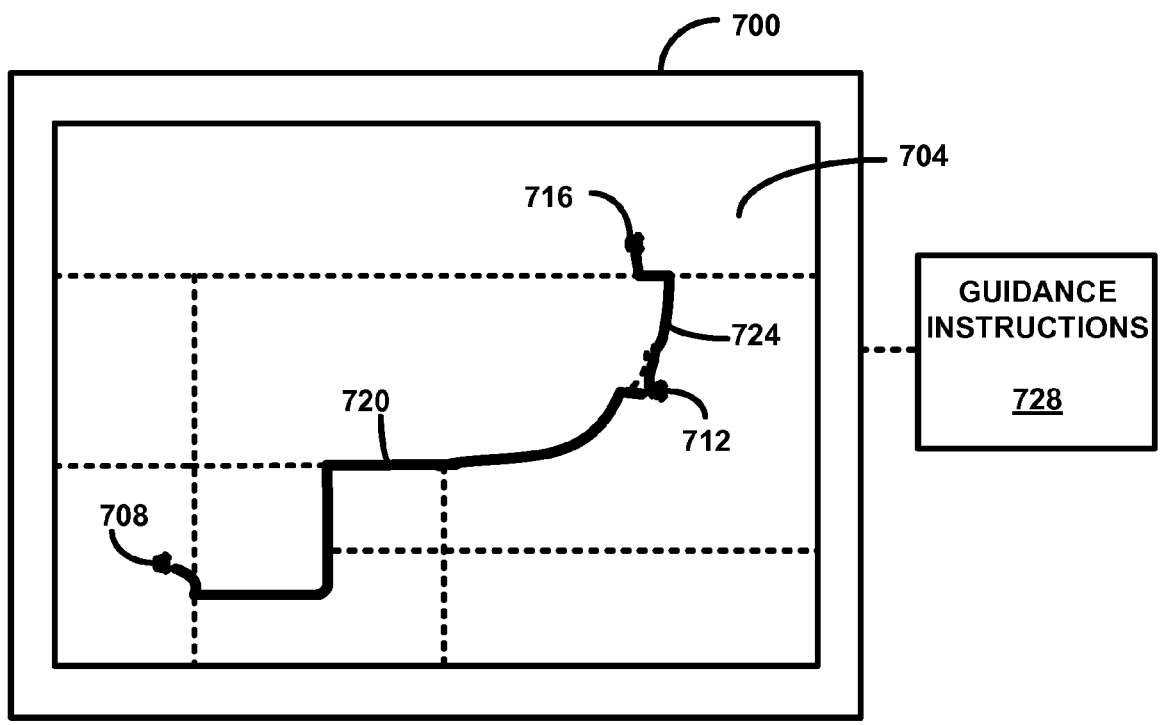
FIG. 7 shows one embodiment of a navigation device and features thereof.

FIG. 7 shows a navigation device 700, such as the navigation device 108, 401, or 601. The navigation device 700 is configured to display a map display 704. For example, after a gasoline station is identified or selected to be part of a route to a rental service return location, a route or portions thereof are calculated and displayed to navigate or guide a user of the navigation device 700. In one embodiment, a first route 720 is calculated and displayed. The first route 720 corresponds to a route from an origin point 708 of the navigation device 700 and/or the rental vehicle 102 to an intermediate point 712, which represents the identified or determined gasoline station. A map display or portions thereof of the first route 720 are shown to the user before and/or when he or she is driving to the gasoline station. A second route 724 is also calculated and displayed. For example, the second route 724 corresponds to a route from the intermediate point 712 to a final destination point 716, which represents the rental service return location or office. A map display or portions thereof of the second route 724 are shown to the user before and/or when he or she is driving to the rental service return location, such as after refueling or after arriving at the gasoline station.

The terms first route 720 and second route 724 are used for descriptive purposes. The first route 720 and the second route 724 may correspond to one route that is calculated all at once or in separate portions. For example, the points 708, 712, and 716 may all be part of one same route. Calculation of the route or portions thereof may occur at one time or are different times based on the location of the navigation device 700 and/or the rental vehicle 102. Also, a map display of the full route or portions thereof may be displayed at various times based on or independent of the location of the navigation device 700 and/or the rental vehicle 102.

Other navigation related functions may be provided. For example, guidance instructions 728 may provide audio and/or text of directions or instructions with respect to navigating to the gasoline station and the rental service return location. For example, the guidance instructions 728 may include descriptions on where to turn, what direction to turn, names of roads, estimated distances, and/or other features that may assist a driver in navigation of the rental vehicle 102. Also, estimated time of arrivals, speed or velocity measurements or estimates, traffic information, and other navigation-related features may be provided.

Figure 8:
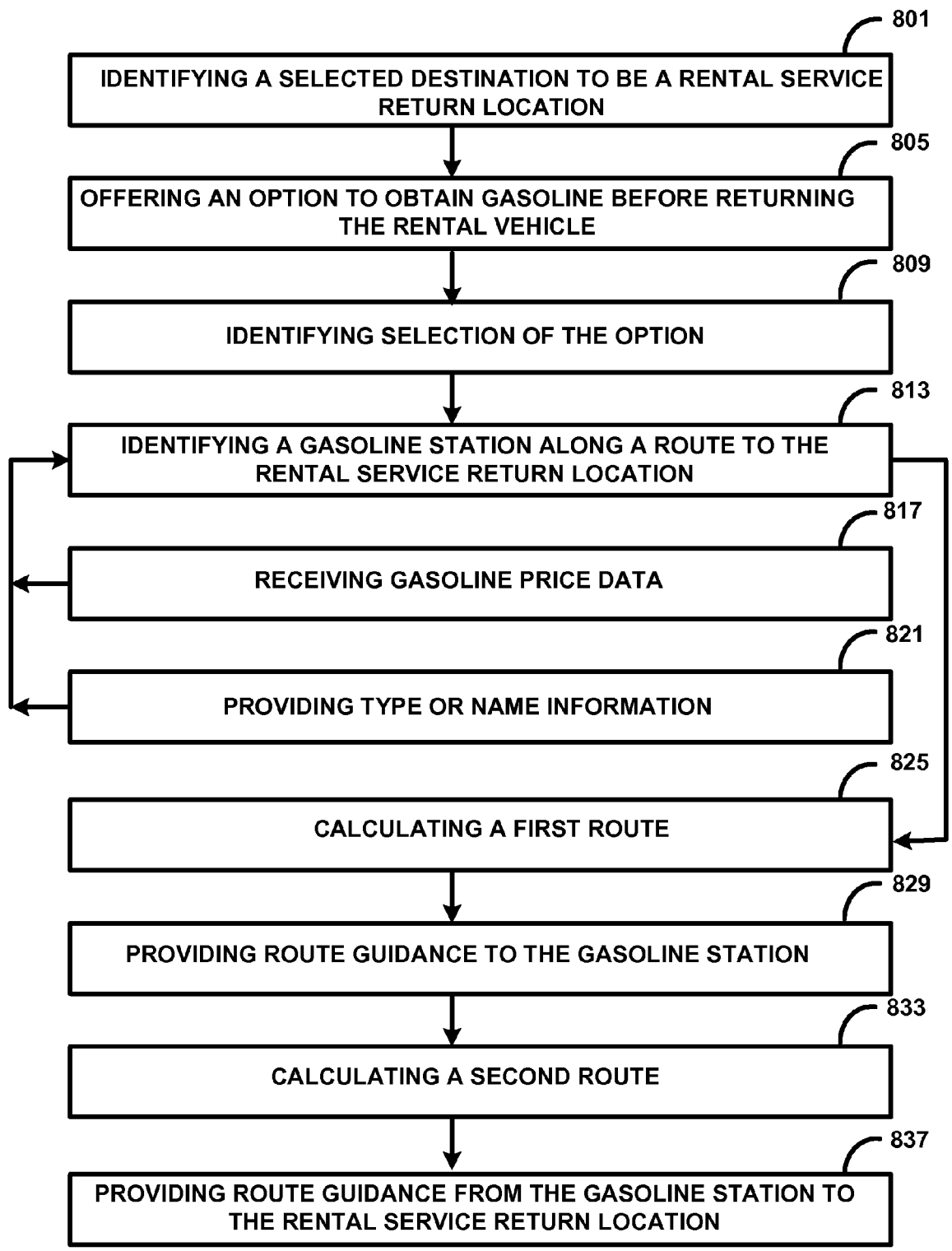
FIG. 8 is a flowchart of a method of routing to a gasoline station before returning a rental vehicle using a navigation device.

FIG. 8 is a flowchart of a method of routing to a gasoline station before returning a rental vehicle, such as the rental vehicle 102, using a navigation device, such as the navigation device 108, 401, 601, or 700. Fewer or more steps or acts may be provided, and a combination of steps may be provided. Also, the steps or acts may be performed in the order as shown or in a different order. The method is implemented by the system and/or devices described herein or by different devices or systems.

In one embodiment, a person rents a rental vehicle, such as the rental vehicle 102, from a rental service provider, such as via a website or in person. The renter may choose a condition to return the rental vehicle to a rental service return location or office with a substantially full tank of gasoline. When the renter decides to return the rental vehicle to the rental service return location, the renter uses a navigation device, such as the navigation device 108, 401, 601, or 700, to route to the rental service return location. For example, the renter pushes a hardware or software button in an in-vehicle navigation system, a PND, a cell phone, a PDA, or other device to route back to the rental service return location. Alternatively, the renter enters an address associated with the rental service return location.

A selected destination is identified to be the rental service return location (Step 801). For example, after the renter or user presses the button to return the rental vehicle or enters the address of the rental service return location, the navigation device (which executes or runs a software application program, such as the application program 217, for obtaining gasoline before returning a rental vehicle) identifies the destination to be associated with the rental service return location. The association may occur based on pre-entered information. For example, a renter or user or a rental service provider may enter address, location, and/or name information associated with a rental service return office, and when the button is pressed to return the rental vehicle, a destination is automatically identified with the rental service return location. Alternatively, the user or renter enters the address of the rental service return location or selects from a plurality of rental service return locations to be the destination, and a geographic database, such as the geographic database 213, associates the address or location with a rental service return location, such as via point-of-interest data or location reference data. Or, after an address or location is selected to be a destination point, the navigation device may ask the user if the destination is a rental service return location.

An option, such as the option 405, to obtain gasoline before returning the rental vehicle to the rental service return location is offered (Step 805). For example, a window, screen, or user interface of the navigation device displays a question, query, or option to obtain gasoline when it is determined that the destination is the rental service return location. The user may choose or not choose to obtain gasoline by using software selection buttons, such as the buttons 413, hardware buttons, such as the buttons 417, or other selection means, such as voice or sound input. In another embodiment, the option may be presented to the user as an audio signal or voice output instead of or in addition to a graphical representation of the option.

Selection of the option is identified (Step 809). For example, the navigation device determines or identifies if the user selected or chose to obtain gasoline or not. If the user did not select the option to obtain gasoline, then a direct route from an origin point or a current position of the navigation device to the rental service return location is calculated.

If the user did select the option to obtain gasoline, then a gasoline station or a data entity thereof along a route to the rental service return location is identified or determined (Step 813). For example, gasoline stations represented in a geographic database, such as the geographic database 213, that surround or are around the rental service return location are located or identified. In one embodiment, gasoline stations within a specified area, such as the area 536, are identified, highlighted, or focused upon. The dimensions or boundaries of the specified area may correspond to a distance that allows for a minimum or relatively little use of gasoline to ensure or provide a substantially full gasoline tank when the rental vehicle is returned to the rental service return location. The size of the specified area may be adjusted or modified by a user or rental service provider via a graphics user interface or other input means. Also, the size of the specified area may be based on the miles-per-gallon rating of a particular rental vehicle.

One of the gasoline stations within the specified area is selected or identified as the gasoline station that is to be part of the route to the rental service return location. The gasoline station may be selected or determined based on gasoline price, name or type of gasoline station, proximity to the rental service return location, convenience factors, and/or other factors. For example, the gasoline station to be identified or determined may be the gasoline station that is nearest or closest to the rental service return location (the gasoline station that requires the minimum distance to be traveled from the gasoline station to the rental service return location), the gasoline station that has the cheapest or lowest gasoline price, the gasoline station of a preferred name brand or type (e.g., a user may want to use a discount or preferred card at a specific type of gasoline station or a user may prefer one type of gasoline over another type), and/or the gasoline station that is located conveniently or relatively the most conveniently with respect to driving to the rental return service return location (e.g., a gasoline station that is on or besides a road that would have been taken if the user would have just wanted to route directly to the rental service return location).

To determine if the location of a gasoline station is convenient, the navigation device may calculate a direct route from an origin point or the current position of the navigation device and/or rental vehicle to the rental service return location. Then a gasoline station that is on or besides a road on the calculated route is identified (e.g., the gasoline station may be within a specified area around the rental service return location). Alternatively, the navigation device may identify the gasoline station, as an intermediate destination, that would require a minimum distance to be traveled from an origin point or the current position of the navigation device and/or rental vehicle to the rental service return location (relative to other gasoline stations). Other convenience factors, such as whether a gasoline station is on the right side of the road or turn restrictions for entering and leaving a gasoline station, may be considered.

If gasoline price data or information is to be used for determining or selecting the gasoline station, gasoline price data (such as price information for unleaded, premium, and/or other grades of gasoline) is received by the navigation device (Step 817). For example, gasoline price data may be provided by a server, such as the server 112, or other device, and the gasoline price data and/or associated location codes, references, or IDs may be transmitted or broadcasted to the navigation device.

The navigation device may also provide type or name information for gasoline stations (Step 821). For example, a geographic database, such as the geographic database 213, may include type and name brand information for gasoline stations, and the geographic database may provide the type and name information to an algorithm or application program for determining the gasoline station to be part of the route to the rental service return location. Alternatively, the type and name information may be received from a remote source, such as the server 112 or 116.

Any number of factors and considerations may be used to identify or determine the gasoline station. If multiple gasoline stations seem to be desirable (e.g., two gasoline stations on opposite corners of an intersection that have the same price and/or that are the same type or brand), the navigation device or program thereof may select one of the gasoline stations based on location (such as one is on the right side of the road), proximity to the rental service return location, random selection, or any other elimination process.

After the gasoline station is identified or determined, a first route, such as the route 720, is calculated (Step 825). For example, a route from an origin point or current position of the navigation device and/or rental vehicle to the gasoline station is calculated. Route guidance and/or map display to the gasoline station is provided (Step 829). For example, the navigation device may display a path or route or portions thereof when driving to the gasoline station. Also, audio and/or text guidance directions or instructions may be provided.

After reaching or arriving at the gasoline station or after refueling, a second route, such as the route 724, is calculated (Step 833). For example, a route from the gasoline station to the rental service return location is calculated. Route guidance and/or map display to the rental service return location is provided (Step 837). For example, the navigation device may display a path or route or portions thereof when driving to the rental service return location, such as after refueling. Also, audio and/or text guidance directions or instructions may be provided.

In another embodiment, one route from the origin point or current position of the navigation device and/or rental vehicle, to the gasoline station (an intermediate destination), and then to the rental service return location is calculated at one moment in time. The first and second routes may be portions of the larger one route. Route guidance and/or map display of the route may be provided based on or independent of the position or location of the navigation device. Other navigation features, such as estimated time of arrival, estimated or calculated speed or velocity, and/or traffic information, may also be provided.

Figure 9:
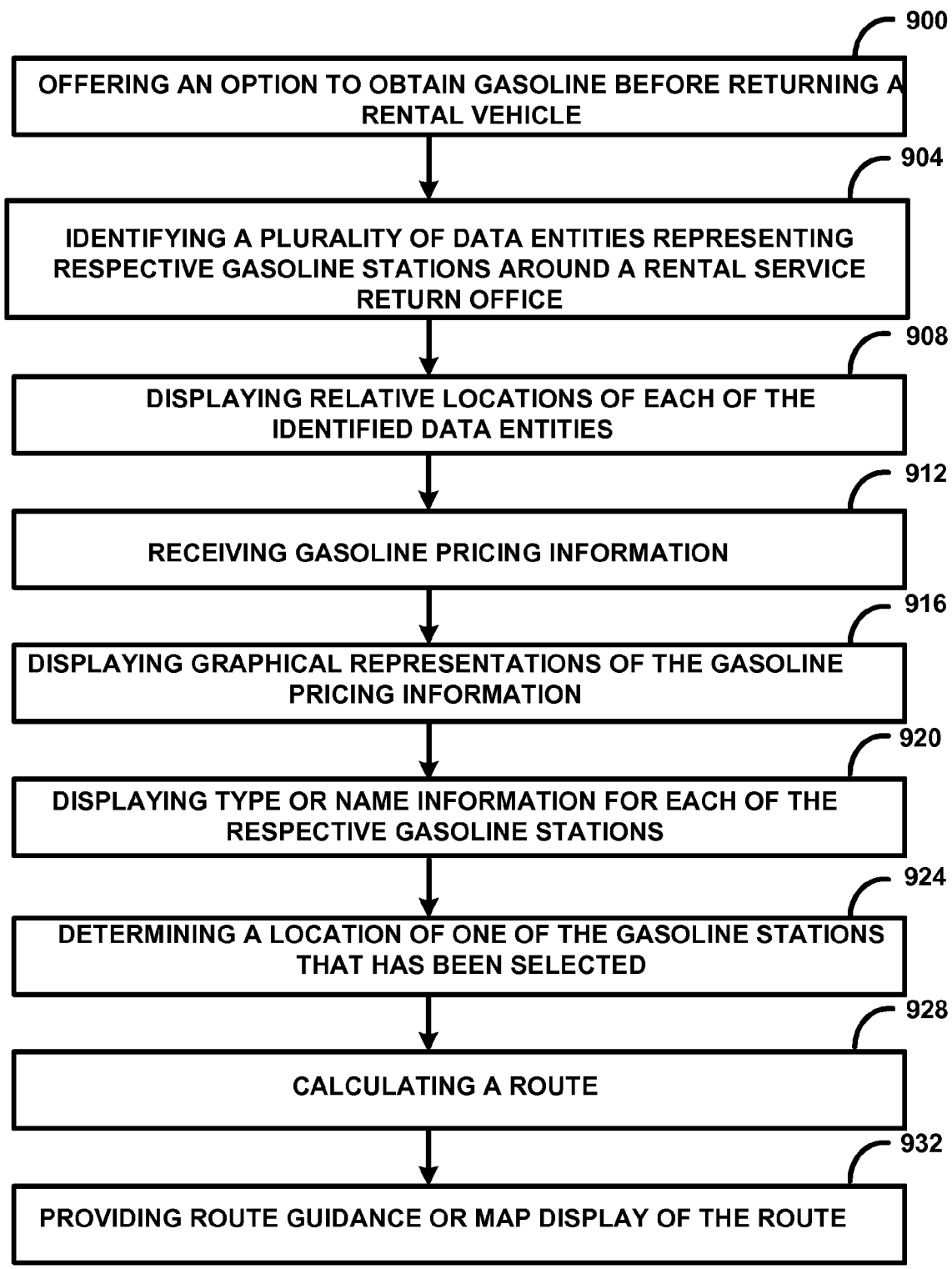
FIG. 9 is a flowchart of another method of routing to a gasoline station before returning a rental vehicle using a navigation device.

FIG. 9 is a flowchart of another method of routing to a gasoline station before returning a rental vehicle, such as the rental vehicle 102, using a navigation device, such as the navigation device 108, 401, 601, or 700. Fewer or more steps or acts may be provided, and a combination of steps may be provided. Also, the steps or acts may be performed in the order as shown or in a different order. The method is implemented by the system and/or devices described herein or by different devices or systems.

An option, such as the option 405, to obtain gasoline before returning the rental vehicle is offered or provided (Step 900). The option may be offered similarly or differently than in Step 805 of FIG. 8. A plurality of data entities representing respective gasoline stations, such as the data entities 512, 516, 520, 524, 528, and 532, around the rental service return office may be identified (Step 904). For example, data entities representing gasoline stations within a specified area, such the data entities 524, 528, and 532, may be identified.

Relative locations of each of the identified data entities may be displayed (Step 908). For example, graphical representations of identified gasoline stations, such as the icons 609, 613, and 617, may be displayed on or in a map display. Gasoline pricing information may be received (Step 912) in a similar or different manner than in Step 817 of FIG. 8. Also, type or name information for the identified gasoline station may be provided as in Step 821 of FIG. 8. Graphical representations of the received gasoline pricing information may be displayed with the gasoline station icons (Step 916). Graphical representations of type or name information of the gasoline stations may also be displayed with the gasoline icons (Step 920). For example, a bubble or information icon, such as the icon 625, 629, or 633, may point to or be displayed next to a gasoline station icon. Alternatively, data representing the gasoline stations and information or data associated with the gasoline stations, such as price, name, distance, or location data, may be in a list format or other format for selection with or without a map display.

A user may select one of the gasoline stations to be an intermediate destination. For example, the user may use a touch screen and/or hardware buttons to select a desired gasoline station. A location or position of the selected gasoline station is determined (Step 924). For example, after one the gasoline stations is selected, the navigation device or application thereof determines or identifies a location, address, coordinates, or other positional information of the gasoline station for calculating a route.

A route from the origin point or current position of the navigation device and/or rental vehicle, to the selected gasoline station (the intermediate destination), and then to the rental service return location is calculated (Step 928). The route may include sub-routes, such as a first route to the gasoline station and a second route to the rental service return location. The calculation of the route or portions thereof may occur at one time or at different times for different portions of the route. Route guidance and/or map display of the route may be provided (Step 932). For example, a display of a calculated path or portions thereof and/or audio/text guidance instructions to assist the user to drive to the gasoline station and then to the rental service return office are provided. The map display and/or route guidance from the gasoline station to the rental service return office may be provided after refueling of the rental vehicle or when the rental vehicle and/or navigation device arrives at or leaves the gasoline station. Other navigation features, such as estimated time of arrival, estimated or calculated speed or velocity, and/or traffic information, may also be provided.

Alternatives

Figure 10:
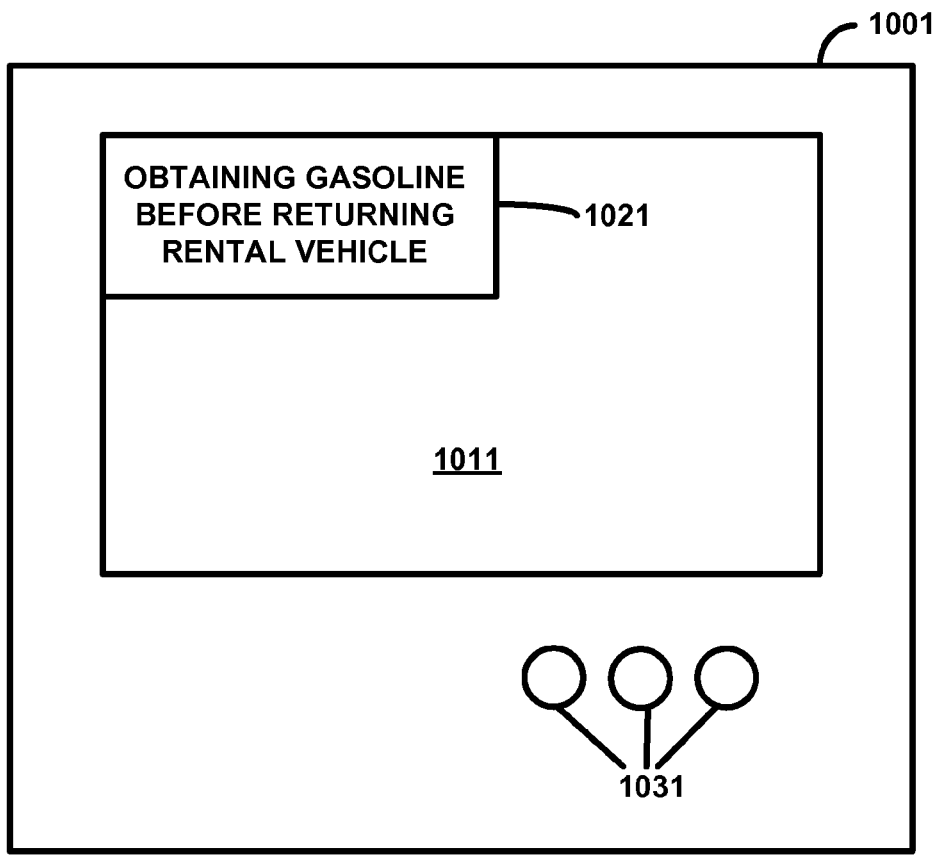
FIG. 10 illustrates an alternate embodiment of a navigation device and features thereof.

FIG. 10 shows a navigation device 1001. The navigation device 1001 includes, but is not limited to, a display 1011 and one or more hardware buttons 1031. The navigation device 1001 may include other components, such as the navigation device 108.

In the description above, an option to obtain gasoline before returning a rental vehicle is offered as a question or query when a user selects a rental service return office or location as a destination point. In an alternate embodiment, a user may be aware that he or she wants to obtain gasoline. Accordingly, an option to obtain gasoline before returning the rental vehicle may be searched for in a software menu or may be presented as a hardware key or function.

For example, a user searches or views a menu or options of a software program application, such as the application program 217. The user may scroll through software options or may open a separate window. A software button or option 1021 may be displayed or shown on the display 1011. The option 1021 may be selected, such as via a touch screen function, to obtain gasoline before returning the rental vehicle. If the option 1021 is selected, a rental service rental office or location is identified as a final destination based on pre-entered information about the rental service rental office, location or position of the navigation device, and/or data in a geographic database, such as the geographic database 213. Alternatively, the user may enter the address or select the rental service return location after selecting the option. Then a gasoline station is selected or identified, as an intermediate destination, along a route to the rental service return location, as described above. Route calculation and map display and/or route guidance is also provided.

Alternatively, the option to obtain gasoline before returning the rental vehicle is provided as one or more hardware buttons 1031. For example, a user may press a key sequence or one button to initiate the navigation process of obtaining gasoline before returning the rental vehicle.

Accordingly, offering an option to obtain gasoline before returning the rental vehicle, such as in Steps 805 and 900, would be to provide a hardware button and/or a software button or selection instead of a query or question to the user.

Figure 11:
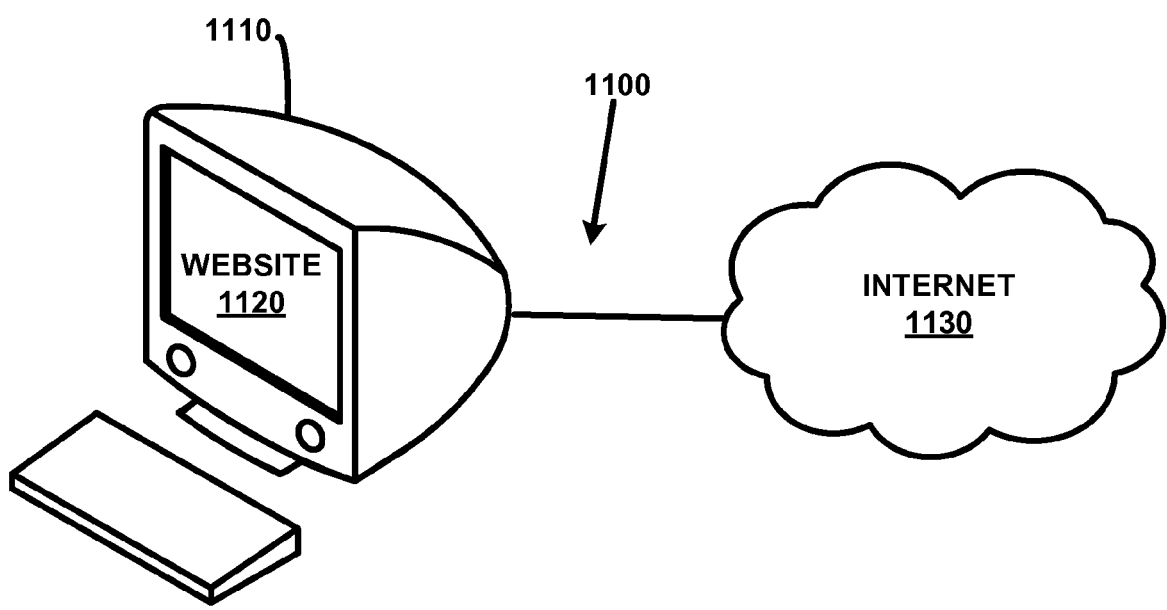
FIG. 11 is a diagram of an alternate system for routing to a gasoline station before returning a rental vehicle.

FIG. 11 is a diagram of an alternate system 1100 for routing to a gasoline station before returning a rental vehicle, such as the rental vehicle 102. The system 1100 includes a computer or computing device 1110 and a network 1130, such as the Internet. For example, a user users the computer 1110 to log onto, open, or view a website 1120 via the network 1130. The website 1120 may be a vehicle direction or navigation website. The user enters an origin point and a destination point to obtain travel directions. The website or software program thereof may recognize the destination point to be a rental service return location based on a geographic database or user input and may offer an option to obtain gasoline, such as the option 405. Alternatively, the website may have a software button or option for a user to select if he or she wants to obtain gasoline before returning a rental vehicle. Based on selection of the option, directions from the origin point, to the gasoline station (the intermediate destination), and then to the rental service return location are provided. A map display for portions of the directions may be provided as well. The directions and/or map display may be printed out for a user to take with him or her, such as via a printer in communication with the computer 1110.

Furthermore, in the description above, the rental vehicle is described as a vehicle that uses a road network. In alternate embodiments, the rental vehicle may be a water vehicle, such as a boat, an aircraft, such as a plane or helicopter, or any other vehicle that may be rented or leased. Also, in the description above, the term gasoline is used as fuel for the rental vehicle. Other terms, such as petrol or petroleum may be used. Also, other types of fuel, such as diesel, bio-fuel, corn or vegetable based fuel, jet fuel, and stations thereof that correspond to a vehicle or rental vehicle may be used or provided. For example, watercrafts, aircrafts, and/or other road vehicles may be refueled at stations or locations that provide appropriate fuel, and such stations or locations may be included in a geographic database, such as the geographic database 213.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

I claim:

1. A method of routing to a gasoline station before returning a rental vehicle using a navigation device, the method comprising:
    receiving data indicative of a gasoline preference;
    identifying, by a processor, a selected destination to be a rental service return location associated with the rental vehicle;
    automatically, by a processor, communicating an option to obtain gasoline before returning the rental vehicle to the rental service return location based on the identification;
    calculating, by the processor, a size of a map area based on a mileage rating of the rental vehicle;
    upon selection of the automatically communicated option, identifying a gasoline station along a route on the map area to the rental service return location based on the gasoline preference, wherein the gasoline station is at a location that allows for a minimum distance to be traveled for arriving at the rental service return location relative to locations of other gasoline stations; and
    providing route guidance to the gasoline station.

2. The method of claim 1, further comprising providing route guidance from the gasoline station to the rental service return location.

3. The method of claim 1, wherein the gasoline preference is a type or brand name.

4. The method of claim 1, wherein identifying the gasoline station comprises identifying a gasoline station within a specified area around the rental service return location.

5. The method of claim 4, wherein boundaries of the specified area correspond to a distance that allows for relatively little use of gasoline to provide a substantially full gasoline tank when the rental vehicle is returned to the rental service return location.

6. The method of claim 1, wherein identifying the gasoline station comprises identifying a gasoline station based on gasoline pricing data.

7. The method of claim 1, wherein identifying the gasoline station comprises identifying a gasoline station that is closest to the rental service return location.

8. The method of claim 1, further comprising:
receiving a user input to identify a condition to return the vehicle.

9. The method of claim 8, wherein the gasoline preference includes the condition to return the vehicle.

10. The method of claim 1, wherein the gasoline preference includes at least one of a price, a type of gasoline station, a name of the gasoline station.

11. The method of claim 1, further comprising:
displaying a map area including the rental service return location and the gasoline station.

12. A method of routing to a gasoline station before returning a rental vehicle using a navigation device, the method comprising:
receiving data indicative of a gasoline preference;
identifying, by a processor, a selected destination to be a rental service return location associated with the rental vehicle;
automatically, by a processor, communicating an option to obtain gasoline before returning the rental vehicle to the rental service return location based on the identification;
calculating, by the processor, a size of a map area based on a mileage rating of the rental vehicle;
upon selection of the automatically communicated option, identifying a gasoline station along a route on the map area to the rental service return location based on the gasoline preference; and
providing route guidance to the gasoline station,
wherein identifying the gasoline station comprises identifying a gasoline station within a specified area around the rental service return location, and
wherein boundaries of the specified area correspond to a distance that allows for relatively little use of gasoline to provide a substantially full gasoline tank when the rental vehicle is returned to the rental service return location.

* * * * *